United States Patent [19]

Ducote

[11] Patent Number: 4,597,811
[45] Date of Patent: Jul. 1, 1986

[54] PREVENTION OF UNWANTED CURE CATALYSIS IN ISOCYANATE CURED BINDERS

[75] Inventor: Marjorie E. Ducote, Huntsville, Ala.

[73] Assignee: The United States of America as represented by the Secretary of the Army, Washington, D.C.

[21] Appl. No.: 751,702

[22] Filed: Jul. 3, 1985

[51] Int. Cl.$^4$ ............................................. C06B 45/10
[52] U.S. Cl. .................. 149/19.92; 149/19.4; 149/19.9; 149/20
[58] Field of Search ............ 149/19.4, 19.9, 19.92, 149/20

[56] References Cited

U.S. PATENT DOCUMENTS

| | | | |
|---|---|---|---|
| 4,070,213 | 1/1978 | Cucksee et al. | 149/19.9 |
| 4,110,135 | 8/1978 | Graham et al. | 149/19.4 |
| 4,181,545 | 1/1980 | Anderson | 149/19.9 |

*Primary Examiner*—Edward A. Miller
*Attorney, Agent, or Firm*—Anthony T. Lane; Robert P. Gibson; Freddie M. Bush

[57] ABSTRACT

This disclosure identifies certain dicarboxylic acids (e.g., maleic and oxalic) and methods of use to obtain extended pot life in diisocyanate cured polymer systems such as hydroxy terminated polybutadienes, polyesters etc. These compounds also prevent catalysis of the urethane reaction by cure inducing materials such as catocene, iron oxide, ferric floride, etc. without interfering with the function of the cure catalyst triphenylbismuthine.

With use of one of these compounds, TPB catalyst can be used even with the more reactive isocyanates. This can be highly desirable since TPB appears to promote the urethane reaction and hence because of this selectivity potentially reduces undesirable side reactions.

Typically pot life is changed from 0-2 hours to 12-15 hours.

The acids must be preblended with the curing agent 30 minutes to 1 hour for more reactive diisocyanates, and 30 minutes to 3 hours for slow reacting diisocyanates such as IPDI to prevent gassing in the propellant.

Pot life increase of the same type has been found to apply to a crosslinked double base propellant and a propellant using a polyester binder.

4 Claims, 8 Drawing Figures

PREVENTION OF UNWANTED CURE CATALYSIS IN ISOCYANATE CURED BINDERS

DEDICATORY CLAUSE

The invention described herein may be manufactured, used, and licensed by or for the Government for governmental purposes without the payment to me of any royalties thereon.

BACKGROUND OF THE INVENTION

Cure catalysts are routinely used in isocyanate cured hydroxy terminated polymer such as hyroxy terminated polybutadiene (HTPB), which is used extensively as a binder for solid rocket propellants. Cure acceleration by means of catalysis has been especially important for curing agents such as isophorone diisocyanate (IPDI), which uncatalyzed, may require several weeks at elevated temperature to react completely. Catalysis can also provide another advantage by reducing side reactions by causing the hydroxyl isocyanate reaction to be favored.

One of the most popular cure catalysts for many years has been triphenyl bismuthine (TPB). This catalyst is activated by many acids, and it was believed necessary to add some form of acid to the liquid propellant to trigger the activity of TPB. Some acids caused the reaction to be triggered so rapidly that some in the industry began to use maleic anhydride (MAN) which they believed would be converted to maleic acid (MA) at some time after addition to the propellant mix and would then activate the TPB. Magnesium oxide (MgO) was also added in the mix cycle to scavenge acid that might initiate TPB activity prematurely. An indepth investigation of the TPB/MA cure catalyst system has revealed that this hypothesis appears to be in error.

In retrospect one skilled in the art acknowledges that obtaining and controlling adequate pot life of solids filled isocyanate cure polymer systems such as polybutadienes, polyesters, etc. has been a formidable problem especially with fast reacting isocyanates or in the presence of such catalytic materials as iron oxide, chromium oxide, catocene, ferric fluoride, etc. The cure reaction consists of the chemical reaction of a di (or poly) isocyanate with the di or poly hydroxyl containing polymer to produce a filled rubber like material. Of particular concern to the skilled artisan is the pot life of a curable system.

Pot life is defined as the time the filled polymer system remains fluid enough to be processed and cast into the appropriate vessel (mold, rocket motor, etc.). This may vary widely according to the system involved. Typically, a minimum of six hours is necessary in production of most rocket motor systems. Extremely catalytic materials such as those mentioned above may reduce pot life to less than one hours. Also some of the more reactive isocyanate curing agents such as tolyene diisocyanate (TDI), may inherently produce a shorter than desired pot life.

Historically, problems in attempting to obtain longer pot life have been addressed by using lower mix temperatures, selective use of certain bonding agents, phosphine oxides, tetracycline, or less reactive isocyanates such as isophorone diisocyanate (IPDI). All of these approaches can create problems and in many instances are still inadequate.

An object of this invention is to obviate the problems associated with catalysis reaction of curing agents by employing other materials that direct the catalysis reaction in the desired direction.

SUMMARY OF THE INVENTION

Data have shown that, in typical composite propellant compositions, longer pot life is obtained with the combination of TPB and MAN than with MAN alone. Further investigation has revelaed that certain acids, including maleic acid (MAC), actually retard or inhibit onset of TPB activity without interference with TPB cure catalysis activity later in the cure cycle. Applicant believes that the increase in pot life seen repeatedly with the use of TPB and MAN results from the conversion of MAN to MAC which inhibits the early catalysis by TPB and impurities in TPB.

Accordingly, the scope of this invention involves: (a) the discovery of certain difunctional acids, primarily oxalic and maleic acids, (b) methods and use that extend pot life of all isocyanate cured systems investigated, and (c) prevention of cure catalysis by the aforementioned cure catalysts without increasing required cure time or interfering with desirable cure rate during the first several hours after addition.

DESCRIPTION OF THE PREFERRED EMBODIMENT

Figure 1:
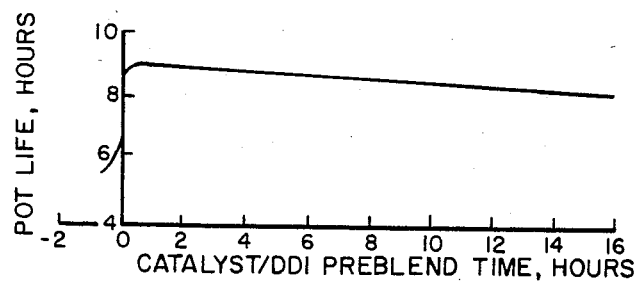
FIG. 1 depicts pot life in hours versus catalyst system (TPB+MAN)-dimeryl diisocyanate preblend time, in hours.

During the investigation of cure catalysis behavior of triphenylbismuth (TPB) and maleic anhydride (MAN), it has been discovered that pot life of a standard composite propellant containing dimeryl diisocyanate (DDI), and hydroxy terminated polybutadiene binder (HTPB), can be increased by mixing the catalyst system with the diisocyanate curing agent before they are added to the propellant slurry. Further, the relationship is time dependent during the first 30 minutes of preblending (See FIG. 1). Mechanical properties either remain unchanged or are enhanced by preblending the cure catalyst system and curing agent. It is suspected that maleic acid (MAC) present as a contaminant in the MAN and produced by hydrolysis of MAN may be responsible for this behavior. A series of mixes with different curing agents and cure catalyst system concentrations of TPB and MAN using the same baseline solids, 18% aluminum (AL), 0.5% iron oxide ($Fe_2O_3$) and 69% ammonium perchlorate (AP), was made in which the same pot life enhancement is found, (see FIGS. 2–6). Pot life was increased from 9 to 11½ hours with isophorone diisocyanate (IPDI), from ½ to 4½ hours with dimeryl diisocyanate (DDI), from 2 to 4½ hours with tolylene diisocyanate (TDI), from 1 to 4¾ hours with tetramethylene diisocyanate (TMDI), and from 0 to 4¼ hours with hexamethylene diisocyanate (HDI).

To determine if pot life extension is caused by the acid, mixes were made from the following baseline composition:
Binder-HTPB, DOA, DDI: 12.48
$Fe_2O_3$: 0.50
AP: 87.00
Acid (as shown below): 0.02

EXPERIMENTAL PROCEDURES

All propellant mixes prepared for this investigation were 600 g mixes processed under vacuum in a Baker Perkins vertical one pint mixer. Baseline compositions used during the program are shown above. However, other binders of the crosslinked double base systems and the polyester binder systems employing isocyanate curing are also usable in the method of this invention. The coarse ammonium perchlorate (AP) is added after the aluminum (Al) and iron oxide ($Fe_2O_3$) have been incorporated ($Fe_2O_3$ used as a burn rate enhancer or catalyst-ballistic modifier also catalyizes the cure rate); this is followed by incremental addition of the fine AP. After the final AP addition, the propellant portion one is mixed for 90 minutes under vacuum. Curing agent and cure acid are added as portion two as indicated below, and the propellant is mixed at high speed, under vacuum, for 15 minutes. Portion two is made by mixing the acid with the DDI (or other diisocynates) 30 minutes before addition to the propellant mix. When no acid is used pot life is 0.7 hours. In a similar but not identical mix (it contained Al and less AP), a MAN containing mix had 1¼ hours pot life. Several acids have been tried and the results are shown in Table I below. There is no correlation with acid dissociation constant. With MAC, a pot life of 7½ hours is found. Fumaric acid which is the geometric isomer of maleic acid gives some increase, to 2.9 hours, but much less effect than the MAC. Succinic, like maleic and fumaric, but with a saturated carbon chain, gave no pot life enhancement to the propellant mix as compared with no acid. Only one acid has been identified that gives greater pot life enhancement than MAC. That is oxalic acid (OXA) which gave a pot life of 10.5 hours.

TABLE I

| Acid | Pot Life of Acids Evaluated | |
|---|---|---|
| | Disc. Constants | Pot Life (hrs) |
| Iodic | $1.67 \times 10^{-1}$ | 1.0 |
| Oxalic | $6.5 \times 10^{-2}$ | 10.5 |
| Maleic | $1.5 \times 10^{-2}$ | 7.1 |

TABLE I-continued

| Acid | Pot Life of Acids Evaluated | |
|---|---|---|
| | Disc. Constants | Pot Life (hrs) |
| Phosphoric | $1.1 \times 10^{-2}$ | 3.0 |
| α alanine | $4.57 \times 10^{-3}$ | 0.7 |
| o phthalic | $1.26 \times 10^{-3}$ | 0 |
| Salicylic | $1.06 \times 10^{-3}$ | 0.9 |
| Tartaric | $9.6 \times 10^{-4}$ | 1.4 |
| Fumaric | $9.3 \times 10^{-4}$ | 2.9 |
| citric | $8.7 \times 10^{-4}$ | 1.2 |
| succinic | $6.63 \times 10^{-5}$ | 0.7 |
| benzoic | $6.3 \times 10^{-5}$ | 0 |
| t-cinnamic | $3.7 \times 10^{-5}$ | <0.3 |
| None | — | 0.7 |

A series of mixes using a baseline composition of HTPB, DOA, curing agent, Al and AP was prepared in which pot life is determined when curing agent and acid (with and without TPB) are varied. Results are shown in Table II below. In this composition pot life is reduced significantly in all trials when TPB alone (no acid or MAN) is added. Pot life is significantly increased when maleic acid or oxalic acid, with or without TPB, are added. Oxalic acid has been more effective than maleic acid. Similar pot life extension is found with all the isocyanates tested, DDI (three lots), TMDI, TDI and IPDI.

TABLE II

Pot Life of Propellants Containing AP and AL

| Additive | % | DDI(P006)* | DDI(7240)* | DDI(7355)* | TMDI | TDI | IPDI |
|---|---|---|---|---|---|---|---|
| None | — | 8.4 | 7.8 | 8.6 | 6.0 | 5.2 | |
| TPB | 0.02 | 4.8 | | 5.8 | 5.2 | | 10.1 |
| MAC | 0.02 | | 9.9 | 10.0 | 8.8 | | |
| OX Acid | 0.02 | 12.9 | | 12.3 | | 7.7/8.2 | |
| OX Acid | 0.02 | 16.0 | | | | | |
| MAN/TPB | .02/.02 | 7.3 | 7.0 | 6.6 | 5.2 | | |
| MAC/TPB | .02/.02 | 9.3 | 9.7 | 10.9 | 7.6 | | |
| OXA/TPB | .02/.02 | | | 12.7 | 10.2 | | 33.0 |
| OXA/TPB | .25/.02 | 15.2 | | | | | |
| MgO | | 8.7 | 8.2 | | 6.0 | | |

*Lot Numbers of DDI

Two series of mixes have been made using DDI curing agent and solids comprises of AP and $Fe_2O_3$. The first set contained 0.5% $Fe_2O_3$, the second set contained 2.0% $Fe_2O_3$. Results are shown in Table III below. Again, pot life of the composition with 0.5% $Fe_2O_3$ is dramatically increased from 0.7 hours to 7.1 hours with maleic acid and 10.5/11.5 hours with oxalic acid. The presence of TPB with oxalic acid does not reduce pot life. In the composition with 2% $Fe_2O_3$ pot life increased from 0 to 9.0 and 9.6 hours with maleic acid and oxalic acid, respectively.

TABLE III

Pot Life of Propellants Containing AP and $Fe_2O_3$

| | Pot Life Catalytic Agent | |
|---|---|---|
| | 0.5% $Fe_2O_3$ | 2% $Fe_2O_3$ |
| Additive | DDI-(P006)* | DDI(7355)* DDI(P006)* |
| None | | 0.70    0 |
| TPB (0.02) | | 0.35    0 |
| Maleic Acid (0.02) | | 7.1 |
| Oxalic Acid (0.02) | 11.5 | 10.5    9.0 |
| Maleic Acid + TPB (0.02 each) | | 5.6 |
| Maleic Anhy + TPB | | 4.5 |
| 0.03MAN 0.02TPB | | |
| Oxalic Acid + | | 11.0    9.6 |

TABLE III-continued

Pot Life of Propellants Containing AP and $Fe_2O_3$

| | Pot Life Catalytic Agent | | |
|---|---|---|---|
| | 0.5% $Fe_2O_3$ | | 2% $Fe_2O_3$ |
| Additive | DDI-(P006)* | DDI(7355)* | DDI(P006)* |
| TPB (0.02 each) | | | |
| MgO | | 0.72 | |

*Lot numbers of DDI, curing agent

Figure 7:
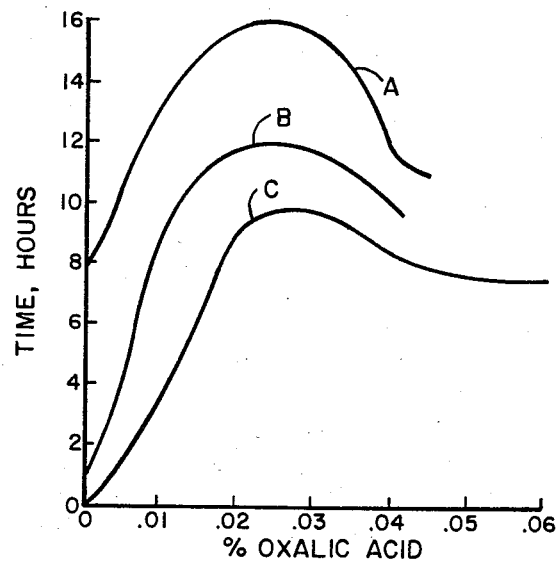
FIG. 7 depicts pot life extension in hours as influenced by various; concentrations of oxalic acid in propellant systems cured by dimeryl diisocyanate and containing variable amounts of $Fe_2O_3$; and, FIG. 8 depicts pot life extension in hours as influenced by various concentrations of oxalic acid in propellant systems cured by isophorone diisocyanate.
Figure 8:
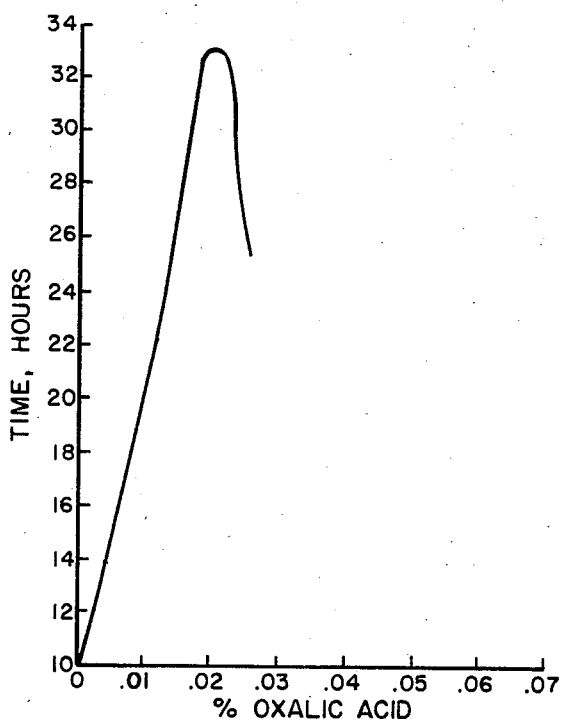
Figure 2:
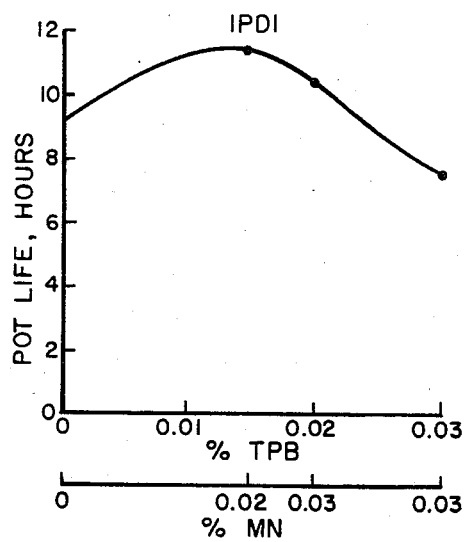
FIGS. 2–6, depict pot life enhancement in hours, for the respectively, diisocyanate cured propellant systems employing isophorone diisocyanate, tetramethylene diisocyanate, and tolyene diisocyanate when employing maleic anhydride premixed with triphenyl bismuthine and each of the respective curing agents.
Figure 3:
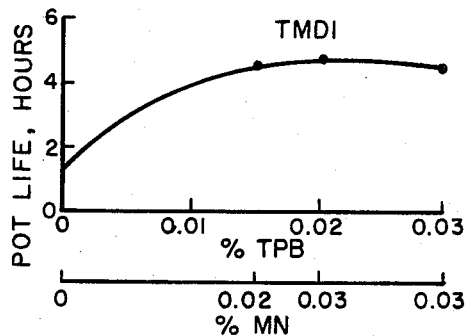
Figure 4:
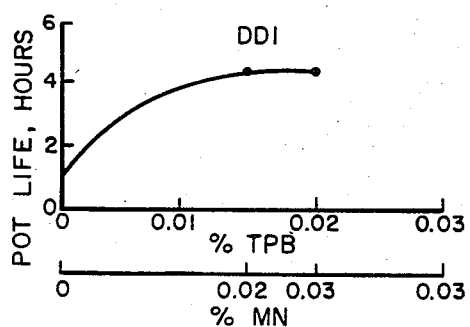
Figure 5:
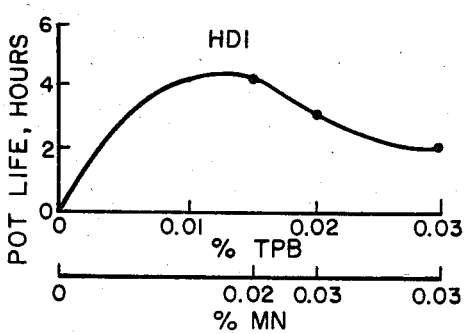
Figure 6:
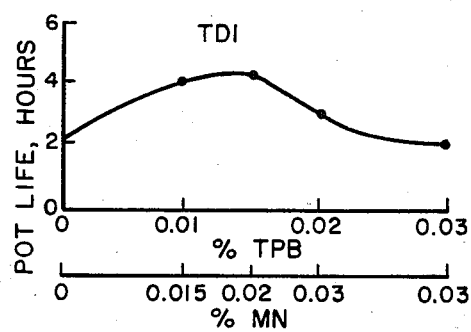

Pot life of three compositions, cured with DDI, containing 0.0%, 0.5% and 2.0% $Fe_2O_3$ with varying concentrations of oxalic acid was determined. Results are shown in FIG. 7 as curves A, B, and C respectively. Maximum pot life for each composition occurred with 0.025% oxalic acid. As seen in FIG. 4 maximum pot life for an IPDI cured composition (with 0.0% $Fe_2O_3$) occurred at 0.02% oxalic acid.

Propellant mixes cured with DDI were made with other known burn rate catalysts-ballistic modifiers, catocene, chromium oxide, copper phthalocyanine and ferric fluoride. These compounds are used in propellants to enhance burn rate and their catalysis of the cure reaction is detrimental to processing. As seen in Table IV below, 0.02% oxalic acid appeared to effectively prevent catalysis by all of these compounds. Differences in pot life of compositions containing the oxalic acid seemed to be related to differences in end of mix viscosity. Typically pot life went from 0–2 hours to 12–15 hours.

TABLE IV

Pot Life Extension with Cure Catalyzing Compounds

| | | ADDITIVE | |
|---|---|---|---|
| Cure Catalyst | % | None | 0.02% oxalic acid |
| Chromium oxide | 2.0 | 0 | 12.5 hours |
| Catocene* | 2.0 | 0 | >15 |
| Cu phthalocyanine | 0.5 | 2.5 | 9.1 |
| Ferric fluoride | 0.5 | 2.7 | 12.0 |

*Burning rate catalyst, a Ferrocene derivative product of Arapahoe Chemicals

Gum stock and propellant cure time studies using IPDI as curing agent (in absence of TPB) showed that oxalic and maleic acid did not adversely affect cure time for the propellants. Gum stock containing no TPB or acid required 17 days to reach a maximum hardness, but with oxalic acid equivalent to 0.02% in propellant the time was 14 days. With TPB but no acid or MAN, maximum hardness was reached in 2 to 7 days, with TPB and oxalic acid or maleic acid, 4 days. With either MAC or MAN 11 days were required. In propellant, maximum hardness was reached in ≈2 days with TPB and ≈3 days with TPB and oxalic acid. Fifteen days were required both with no TPB and acid and with oxalic acid alone.

The acids must be preblended with the curring agent 30 minutes to 1 hour for more reactive isocyanates, and 2 hours for slow reacting isocyanates such as IPDI to prevent gassing in the propellant.

The same type pot life increase was found in a cross-linked double base propellant and a propellant using a polyester binder.

I claim:

1. In a process of compounding and mixing a propellant composition comprised of a first portion of propellant ingredients comprising a dioscyanate curable binder system selected from the group consisting of a hydroxyl terminated polybutadiene binder, a cross-linked double base binder, and a polyester binder; a solid oxidizer of variable particle size ammonium perchlorate ranging from ultra fine to coarse; aluminum metal fuel; a metal-containing burn rate catalyst-ballistic modifier; and an optional bonding agent for coating the ammonium perchlorate oxidizer; and a second portion of said propellant composition comprising a diisocyanate curing agent; a curing catalyst of triphenyl bismuthine; and a difunctional acid selected from oxalic and maleic or the anhydride of maleic acid; the improvement in the compounding and mixing process to first achieve the prevention of unwanted cure catalysis directly effecting a decreased pot life while subsequently permitting the cure catalysis of triphenyl bismuthine to achieve the proper curing of said propellant composition comprised of said first and said second portions, said improvement in the compounding and mixing process comprising:

(i) compounding and mixing said first portion of said propellant composition in a first vessel for a predetermined time of about 90 minutes under vacuum, said compounding order being the incremental addition of said aluminum metal fuel to said diisocyanate curable binder system, followed by the incremental addition of said metal-containing cure catalyst, the incremental addition of said coarse particle size ammonium perchlorate, the incremental addition of said ultra fine ammonium perchlorate, and the addition of said optional bonding agent for coating said ammonium perchlorate oxidizer;

(ii) compounding said second portion of said propellant composition in a second vessel which comprises adding a predetermined amount of said triphenyl bismuthine and a predetermined amount of said difunctional acid to a predetermined amount of said diisocyanate curing agent;

(iii) mixing said second portion of said propellant composition for a predetermined time from about 30 minutes to about one hour to form a preblend of a more reactive diisocyanate and for a predetermined time from about 30 minutes to about three hours to form a preblend of less reactive diisocyanate; and, (iv) adding said preblend containing said diisocyanate curing agent, said triphenyl bismuthine, and said difunctional acid to said first portion of said propellant composition and continue mixing at high speed, under vacuum, for about 15 minutes to achieve a pot life ranging from about 4¼ hours to about 11½ hours as compared with a pot life of 0 hours to about 1¼ hours when no difunctional acid is employed in said preblend.

2. The improvement in the process of compounding and mixing said propellant composition as defined in claim 1 wherein said metal-containing burn rate catalyst-ballistic modifier is selected from the group consisting of $Fe_2O_3$, chromium oxide, a ferrocene, copper phthalocyanime, and ferric fluoride and wherein said diisocyanate curing agent is selected from the group of more reactive diisocyanates consisting of dimeryl diisocyanate, tolylene diisocyanate, tetramethylene diisocyanate, and hexamethylene diisocyanate or a less reactive diisocyanate of isophorone diisocyanate.

3. The improvement in the process of compounding and mixing said propellant composition as defined in claim 2 wherein said metal-containing burn rate catalyst-ballistic modifier is $Fe_2O_3$ which is present in an amount from about 0.50 percent to about 2.00 percent by weight in said first portion of said propellant composition and wherein said difunctional acid is present in an amount from about 0.01 to about 0.03 weight percent in said preblend with said more reactive diisocyanate additionally containing said triphenyl bismuthine in an amount from about 0.01 to about 0.03 weight percent.

4. The improvement in the process of compounding and mixing said propellant composition as defined in claim 2 wherein said metal-containing burn rate catalyst-ballistic modifier is $Fe_2O_3$ which is present in an amount from about 0.50 percent to about 2.00 percent by weight in said first portion of said propellant composition and wherein said difunctional acid is present in an amount from about 0.02 to about 0.03 weight percent in said preblend with said less reactive diisocyanate isophorone diisocyanate additionally containing said triphenyl bismuthine in an amount from about 0.01 to about 0.03 weight percent.

* * * * *